July 18, 1967   R. G. HOFFERT   3,331,308
ROTISSERIE WITH ROLLERS FOR SUPPORTING SAUSAGES
Filed April 13, 1966
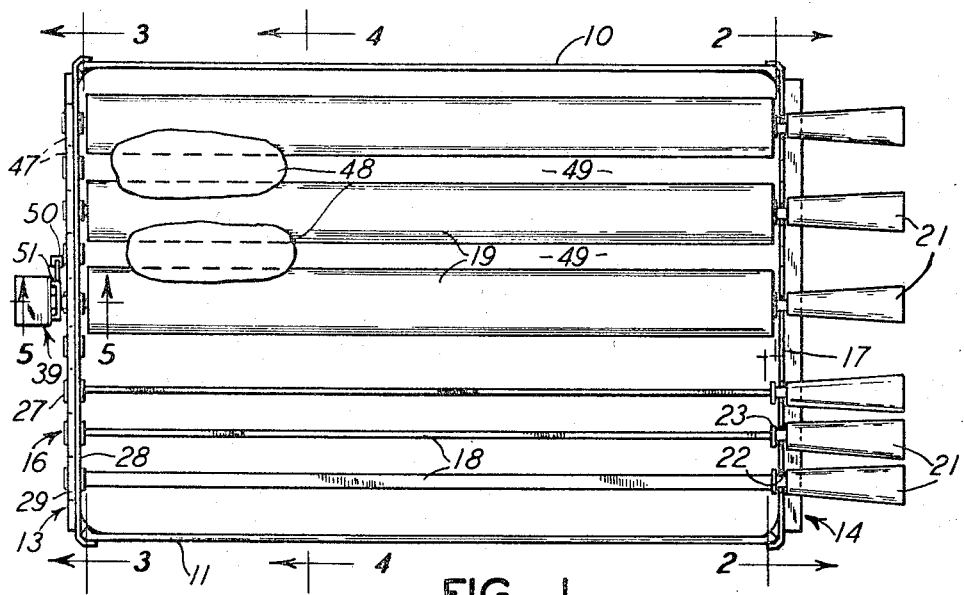
FIG. 1
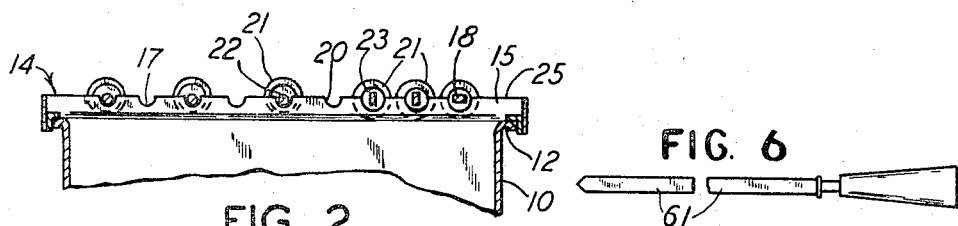
FIG. 2
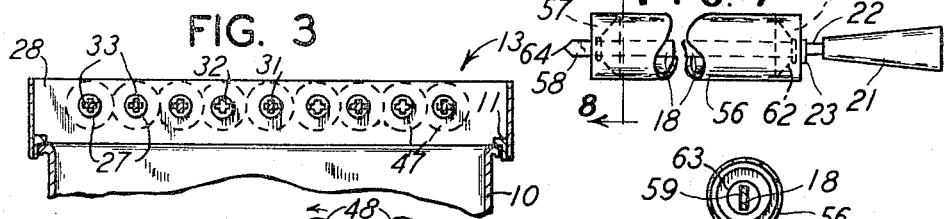
FIG. 3
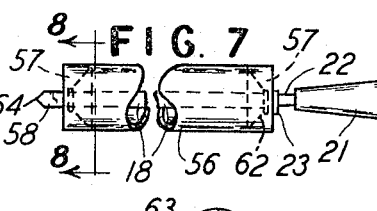
FIG. 6
FIG. 7
FIG. 8
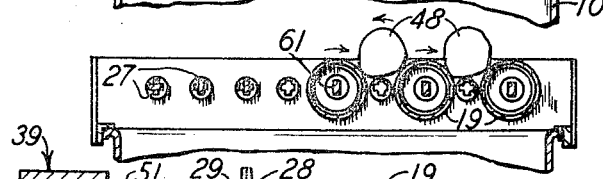
FIG. 4
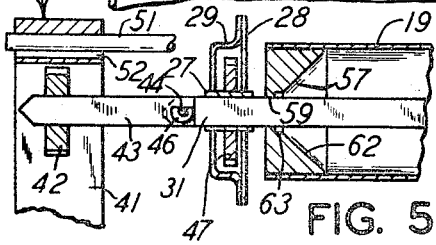
FIG. 5
INVENTOR:
ROY G. HOFFERT
BY: Arthur J. Hanemann
ATTORNEY

United States Patent Office 3,331,308
Patented July 18, 1967

3,331,308
ROTISSERIE WITH ROLLERS FOR SUPPORTING SAUSAGES
Roy G. Hoffert, 423 Melvin Ave., Racine, Wis. 53402
Filed Apr. 13, 1966, Ser. No. 542,270
6 Claims. (Cl. 99—340)

This is a continuation-in-part of my U.S. patent application Ser. No. 523,328, filed Jan. 27, 1966.

This invention relates to a rotisserie convertible between a skewer type and a roller type.

Rotisseries are commonly employed today and are in common use for outdoor cooking as well as indoor cooking. Also, it is common to have a rotisserie, including a pan element with a heating means of either the electric or combustible type, and to have skewers or like food-supporting members rotatably mounted on the pan or the like. Further, the unit is commonly arranged with a drive means which rotates the skewers so that the food is rotatably supported over the source of heat, and it is thereby arranged to evenly cook the food.

It is a general object of this invention to provide a rotisserie which is readily, easily, and inexpensively converted between a skewer type and a roller type. The roller type is that which has the food supported between two rollers which are rotatable to in turn rotate the food which is generally in tubular or sausage shape. Of course the food is rotatably supported above the source of heat for the desired cooking.

A more specific object of this invention is to provide a rotisserie which alternately receives both the skewers and the rollers for supporting the food. That is, the skewers and the rollers may be used alternately and at the same time in different positions on the rotisserie, or they may be readily interchanged, all as desired by the cook.

Another specific object of this invention is to provide a rotisserie which receives both skewers and rollers, and wherein the skewers serve as the support and drive connection and provide the handles for the rollers. In accomplishing this object, the skewers may be used either without the rollers or they may be telescoped inside the rollers and again placed in a rotatably supported position on the rotisserie pan, and the skewers then normally extend beyond both ends of the rollers for rotatably supporting the rollers in a desired driving position.

Still a further object is to provide a rotisserie convertible between a roller type and a skewer type, wherein the skewers can be easily positioned inside the rollers and through openings in the ends of the roller.

Still a further object of this invention is to provide a roller arrangement for a rotisserie, wherein the rollers are arranged and adapted to readily heat up when subjected to the cooking heat source, and the rollers are arranged to retain the heat and are not permitted to ventilate or pass off the heat which they are subjected to from the heat source.

Another object of this invention is to provide a roller type of rotisserie which can be easily manufactured, is inexpensive, is easily used and maintained, is easily stored when not in use, and is efficient in its use.

Other objects and advantages become apparent upon reading the following description in light of the accompanying drawings, wherein:

FIG. 1 is a top plan view of a rotisserie having both skewers and rollers thereon.

FIG. 2 is a sectional view taken along the line 2—2 of FIG. 1.

FIG. 3 is a sectional view taken along the line 3—3 of FIG. 1.

FIG. 4 is a sectional view taken along the line 4—4 of FIG. 1.

FIG. 5 is an enlarged sectional view taken along the line 5—5 of FIG. 1.

FIG. 6 is a plan view of a skewer shown in FIG. 1, with parts broken away.

FIG. 7 is a plan view of a combined roller, including the skewer, shown in FIG. 1 and having parts broken away.

FIG. 8 is a sectional view taken on the line 8—8 of FIG. 7.

The rotisserie includes the support piece or pan 10 which is generally rectangularly shaped in plan view in FIG. 1. The pan 10 extends downwardly, as fragmentarily shown in FIGS. 2, 3, and 4, and it will of course be understood that a source of heat, preferably an electric heating coil (not shown), would be employed in the pan 10 for cooking purposes, all in the well-known manner. A frame piece 11 is removably supported on the pan 10 and is of a rectangular shape similar to that of the pan 10 to fit over the upper rolled edge 12 of the pan 10. The piece 11 has two spaced-apart portions 13 and 14 which are located on opposite ends of the rotisserie and which contain the rotatable drive means 16 and rotatable supports or bearing surfaces 17, respectively. Thus it will be understood that skewers 18 and rollers 19 extend between the portions 13 and 14 and are rotatably supported by the members 16 and 17.

The support member portion 14 is shown in FIG. 2 to include an uprightly disposed panel 15 which has a plurality of notches 20 along its upper edge 25. The notches 20 actually provide the means for receiving the skewers 18 in the rotatable manner mentioned. The skewers 18 have handles 21 which are disposed beyond the panel piece 15, and the skewers have circular shafts 22 which are nested in and rotatably received by the notches 20 for the rotatable support of the skewers 18. A flange 23 is provided on the skewers 18 to limit axial movement of the skewers with respect to the panel 15.

The opposite ends of the skewers 18 are supported on the portion 16 in drive sockets 27 which are rotatably mounted on a panel piece 28 and a supporting sheet 29, as shown in FIG. 5. The sockets 27 are spaced along the pieces 28 and 29 to align with the notches 20 in the piece 15. The ends of the skewers 18 are then drivingly received in the sockets 27 so that the skewers rotate along with and in response to the rotation of the sockets 27. Thus FIG. 5 shows the center roller 19 and the projected end 31 of a skewer 18 disposed within the socket 27 which has a cruciform opening 32 extending through the socket 27, in the shape shown in FIGS. 3 and 4. Thus FIG. 3 shows the skewer end 31 received in the opening in the central socket 27, and it also shows the other skewer ends 33 received in the openings 32 in their respective sockets 27. The ends 31 and 33 are readily insertable and removable with respect to the socket 27 so that one can readily place and remove the skewers 18 and the rollers 19 with respect to the support member 11.

Actually, the center roller 19, which is shown in FIG. 5, has a special skewer end 31 for purposes of connecting to the rotatable drive means described later. The other rollers 19 have plain and shorter skewers extending therethrough, as shown in FIG. 7. The special skewer end 31 is made for connecting to a drive means, such as an electric motor 39, which rotatably drives the skewers 18 and the rollers 19. FIG. 5 shows the motor casing 41 and a gear 42 is suitably rotatably mounted in the casing 41. A driven arm 43 extends from the casing 41 and is attached to the roller end 31 by means of a pin 44 and a removable snap ring 46. Thus, in this or any other conventional manner, the motor driven arm 43 is connected to the roller drive arm 31 so that the roller 19 will be rotated and the socket 27 will also be rotated. A gear 47 is affixed to each of the sockets 27 to rotate therewith, and the gears 47 form a train of gears disposed along the pieces 28 and 29. Thus all of the gears 47 and the sockets 27 rotate in the manner of a continuous gear train so that each gear rotates in a direction opposite to its adjacent gear which is in mesh with it. However, as shown in FIGS. 1–4, the rollers 19 are disposed in every other socket 27, and thus the rollers will rotate in the same direction since every other gear 47 will be rotating in the same direction.

With this arrangement, sausage-shaped food items which are designated 48 may be rotatably supported on the rollers 19 to be slowly rotated as they are disposed above the space between adjacent rollers 19, as shown. The sausages are therefore subjected to heat and are slowly turned to be uniformly cooked. The feature of rotating the rollers in the same direction, such as clockwise in FIG. 4, will cause the sausages 48 to rotate counter-clockwise, as indicated in FIG. 4. Since the roller on the left in FIG. 4 is then moving its contact surface downwardly, at the point of support of the sausage 48, the roller in the middle position in FIG. 4 is moving its contact surface upwardly, and this cooperation between the rollers prevents the sausage from falling out from between the rollers. The sausage therefore cannot cling or stick to either roller and be carried out of the space between two adjacent rollers.

The outer diameters of the rollers 19 are shown to be greater than the space designated 49 between the rollers 19. This relationship permits the conversion of a skewer type rotisserie to a roller type rotisserie for the suitable support of the sausages 48 and the desired rotational action described. Of course when the rollers are not used, the skewers 18 would normally be in all the sockets 27 and thus be placed in adjacent sockets 27, since the direction of rotation of the skewers is not significant in the support and cooking of the food on the skewers.

The motor 39 may be supported on the rotisserie by means of a bracket 51 extending into an opening 52 in the motor housing 41. The bracket 51 may be supported on a block 50 attached to the rotisserie pan 10 in any suitable manner. Thus the motor 39 can be readily removed from the remainder of the rotisserie since it can be slipped up off the bracket 51 and away from the roller end 31 after detachment of the snap ring 46, or the driven arm 43 can slide out of the motor gear 42, both in any conventional manner.

The rollers 19 are formed of a tubular piece 56 and circular end caps 57. There is of course a cap 57 on each end of the piece 56, and the caps 57 are relatively air-tight on the ends of the piece 56 which is therefore substantially enclosed for purposes of retaining all of the heat to which the roller 19 is subjected. The skewer 18 is shown in FIG. 7 telescoped with the tubular piece 56 and extending in one end 58 beyond the tubular piece 56. Of course the skewer flange 23, circular shaft 22, and handle 21, all project beyond the other end of the tubular piece 56, as shown in FIG. 7. The end caps 57 may be pressed onto the piece 56 and disposed completely therewithin, as shown. Also, the caps 57 have rectangular openings 59 extending therethrough and being coaxially aligned and oriented between the caps 57 for snug sliding reception of the skewer 18. Of course the skewer may then be slid into and out of the tubular piece 56 so that the rotisserie can be easily converted from a skewer type to a roller type. All that need be provided for the rollers is the tubular piece 56 and the end caps 57.

Of course the included transverse cross-sectional area of the roller piece 56 is considerably larger than that corresponding transverse cross-sectional area of the skewer prong 61 which is the elongated and extended portion of the skewer 18. Also, the rectangular opening 59 of the end caps 57 is of a size and shape similar to the opening 32 in the socket 27 so that the skewer will slip through the roller piece 56 and into the socket 27. The piece 56 is preferably of an outer diameter of one and one-half inches and a wall thickness of one thirty-second of an inch. This type of roller will therefore readily heat up and will retain the heat inside and in the wall of the roller since the roller is of a hollow interior but substantially air-tight in that the only opening is the opening 59 in the end caps, and these openings are filled by the skewer prongs 61.

Also, the length of the roller piece 56 is less than that of the prong 61, so the piece 56 is disposed entirely between the rotisserie ends 13 and 14. Of course the rotation of the skewers 18 causes similar rotation of the roller pieces 56, as desired.

To facilitate insertion of the skewers 18 into the roller openings 59, the end caps 57 are provided with conically-shaped interior walls 62 which provide a lead for the skewer ends 58 to align with the openings 59. Also, a circular recess 63 exists intermediate the conical wall 62 and the opening 59. Then, the point 64 on the end 58 can be fed into the opening 59 simply by pushing the skewer into the roller body 56. Even a bent skewer can be easily inserted. Also, the roller body 56 is symmetrical end-to-end, so the skewer can be inserted from either end of the roller body.

While a specific embodiment of this invention has been shown and described, it should be obvious that certain changes could be made in the embodiment and the invention should therefore be determined only by the scope of the appended claims.

What is claimed is:

1. A rotisserie convertible between a skewer type and a roller type, comprising a plurality of skewers which are elongated and adapted for piercing food to be cooked, a support piece having spaced-apart support means for removably and rotatably supporting said skewers at two points on opposite ends of said skewers, rotational drive means engaged with said support means at one end of said skewers for rotating the latter, a plurality of rollers with each being of a length less than the length between said two points on said skewers and being of a transverse cross-sectional area greater than the transverse cross-sectional area of said skewers, and said skewers being snugly removably telescoped within said rollers and beyond both ends of said rollers and with said rollers having openings extending coaxially therethrough and being of a shape corresponding to the transverse cross-sectional shape of said skewers for snugly slidably receiving said skewers to support said rollers on said skewers and to rotate said rollers along with the rotation of said skewers.

2. The subject matter of claim 1, wherein said rollers are hollow tubes and include two caps affixed on opposite ends thereof and with said caps containing the said openings of said rollers for snugly removably and rotationally drivingly receiving said skewers.

3. The subject matter of claim 2, wherein the wall thickness of said hollow tubes is only approximately one thirty-second of an inch thick and the outer diameter of said hollow tubes is approximately one and one-half inch, and said end caps are relatively air-tight with said hollow tubes, except for said openings in said caps, for effecting a retort to retain heat inside said hollow tubes.

4. The subject matter of claim 1, wherein said roller is a hollow tube and includes a cap on the end thereof containing one of said openings of said roller and with said cap having a conically-shaped wall adjacent said opening for guiding said skewer into said opening.

5. The subject matter of claim 1, wherein said roller is symmetrical in end-to-end relation and is a hollow tube and includes a cap in each end of said tube, and with said caps having said openings of said rollers and having conically-shaped walls adjacent said openings for guiding said skewer into said openings from each end of said tube.

6. The subject matter of claim 1, wherein said support means at said one end of said skewers have openings of the shape of said openings in said rollers for snugly removably and rotationally drivingly receiving said one end of said skewers.

References Cited

UNITED STATES PATENTS

| | | | |
|---|---|---|---|
| 694,889 | 3/1902 | Pooley | 99—421 X |
| 2,185,979 | 1/1940 | Dumas | 99—423 |
| 2,577,963 | 12/1951 | Hagopian | 99—421 X |
| 2,705,450 | 4/1955 | Steinbook | 99—427 X |
| 2,760,428 | 8/1956 | Boyajian | 99—427 |
| 2,938,450 | 5/1960 | Carpenter et al. | 99—427 |

WALTER A. SCHEEL, *Primary Examiner.*

A. O. HENDERSON, *Assistant Examiner.*